(12) United States Patent
Okano et al.

(10) Patent No.: US 6,834,980 B2
(45) Date of Patent: Dec. 28, 2004

(54) ILLUMINATION LAMP EQUIPMENT

(75) Inventors: Hirofumi Okano, Saitama Prefecture (JP); Keiji Shimoyama, Saitama Prefecture (JP)

(73) Assignee: Kabushiki Kaisha T AN T (JP)

(*) Notice: Subject to any disclaimer, the term of this patent is extended or adjusted under 35 U.S.C. 154(b) by 113 days.

(21) Appl. No.: 10/454,600

(22) Filed: Jun. 5, 2003

(65) Prior Publication Data
US 2003/0210545 A1 Nov. 13, 2003

Related U.S. Application Data

(62) Division of application No. 09/987,312, filed on Nov. 14, 2001, now abandoned.

(30) Foreign Application Priority Data

Apr. 13, 2001 (JP) ........................................ 2001-114973

(51) Int. Cl.$^7$ .............................................. H01R 33/00
(52) U.S. Cl. ........................ 362/226; 362/457; 362/800
(58) Field of Search .................................. 362/226, 457, 362/800, 549; 257/99; 361/760, 783, 782; 313/498–512; 525/232, 176, 445

(56) References Cited

U.S. PATENT DOCUMENTS

| | | | |
|---|---|---|---|
| 3,617,962 A | 11/1971 | Wilson et al. | 335/151 |
| 4,471,414 A | 9/1984 | Savage, Jr. | 362/226 |
| 4,731,413 A * | 3/1988 | Droscher et al. | 525/64 |
| 5,931,577 A | 8/1999 | Ishibashi | 362/800 |
| 5,990,773 A | 11/1999 | Sengoku | 335/208 |
| 6,100,608 A | 8/2000 | Takahashi | 307/125 |
| 2001/0012200 A1 * | 8/2001 | Edwards et al. | 361/760 |

FOREIGN PATENT DOCUMENTS

| | | | | |
|---|---|---|---|---|
| EP | 0 495 685 | 7/1992 | | B60Q/1/30 |
| JP | 7-110256 | 4/1995 | | G01F/23/62 |
| JP | 11-7874 | 1/1999 | | H01H/36/00 |
| WO | WO 00/26537 | 5/2000 | | F04B/19/22 |

* cited by examiner

Primary Examiner—Alan Cariaso
Assistant Examiner—Mark Tsidulko
(74) Attorney, Agent, or Firm—Nixon & Vanderhye P.C.

(57) ABSTRACT

When molding the illumination lamp with a conventional resin, since the temperature of the resin is in the range of 240 to 300° C. and the injection pressure is in the range of 400 to 1300 Kg/cm$^2$ at the time of injection, the illumination lamp may be melt by the temperature of the resin or may be broken by the injection pressure.

3 Claims, 3 Drawing Sheets

ILLUMINATION LAMP EQUIPMENT

This application is a Divisional of application Ser. No. 09/987,312, filed Nov. 14, 2001 (now abandoned), the entire content of which is hereby incorporated by reference in this application.

BACKGROUND OF THE INVENTION

1. Field of the Invention

The present invention relates to an improvement of illumination lamp equipment to be mounted on the vehicle illumination such as the interior lighting of the window control switch, the interior lighting of the ashtray, and the foot lighting, or on the front panel of the electronic equipment, comprising a LED, a small light bulb, or the like for indicating the operating position or the driving condition.

2. Description of the Related Art

The conventional lighting tool used for illumination lamp equipment described above includes LEDs or small light bulbs. The exposed portion of the LED or the small light bulb is made of glass or synthetic resin. Therefore, it is difficult to mount these illumination lamps on the vehicle or on the electronic equipment in the exposed state and it may be broken very easily in the exposed state.

Therefore, in general, a housing for mounting the illumination lamp such as the LED or the small light bulb is manufactured and the illumination lamp is fitted into the housing. However, since the housing is constructed of two halves or formed into cylindrical shape, it is necessary to combine two halves and secure with an adhesive agent with the illumination lamp mounted, or to close the lid with the illumination lamp mounted. Therefore, there is a problem in that the point of fixation between the housing and the illuminating lamp is susceptible to generation of a gap, which may result in entering of dust or backlash, in addition to the problem in that the number of components or the number of manufacturing steps increases.

Consequently, as a measure to solve the conventional problems described above, molding the illumination lamp with a nylon base synthetic resin, which is normally used for molding, is conceivable. However, in the method of molding the illumination lamp with nylon base resin, the temperature of the resin is in the range of 250 to 300° C. and the injection pressure is in the range of 400 to 1300 Kg/cm$^2$ at the time of injection as shown in FIG. 5. Thus, the illumination lamp such as the LED or the small light bulb may disadvantageously be melted by the temperature of the resin or may be broken by the injection pressure.

SUMMARY OF THE INVENTION

Accordingly, the present invention is intended to solve the problems described above, and it is an object of the present invention to provide an illumination lamp equipment in which the illumination lamp is not melted or damaged during injection molding by employing a hot-melt resin as a material for molding the illumination lamp.

In order to achieve the object described above, the illumination lamp equipment is constructed in such a manner that the illumination lamp such as a LED or a small light bulb is molded with a hot-melt resin with a part of the head portion of the illuminating lamp exposed.

The lead exposed from the molded portion may be connected to the connector, and in the case where a LED is used as an illuminating lamp, it is also possible to connect the lead of the LED to the printed board to which a resistor is connected, and then mold the LED and the printed board with the hot-melt resin except for a part of the head portion of the LED.

Alternatively, in the case where the lead of the illumination lamp constructed of a LED or a small light bulb is connected to the terminal of the connector in advance, the illumination lamp and a part of the connector are molded with the hot-melt resin with a part of the illumination lamp exposed, and a LED is used as an illumination lamp, it may be constructed in such a manner that the lead of the LED is connected to the printed board to which a resistor is connected, and then the printed board is connected in turn to the connector, and subsequently, the printed board, the LED except for a part of the head portion, and a part of the connector are molded with the hot-melt resin.

DESCRIPTION OF THE PREFERRED EMBODIMENTS

Figure 1:
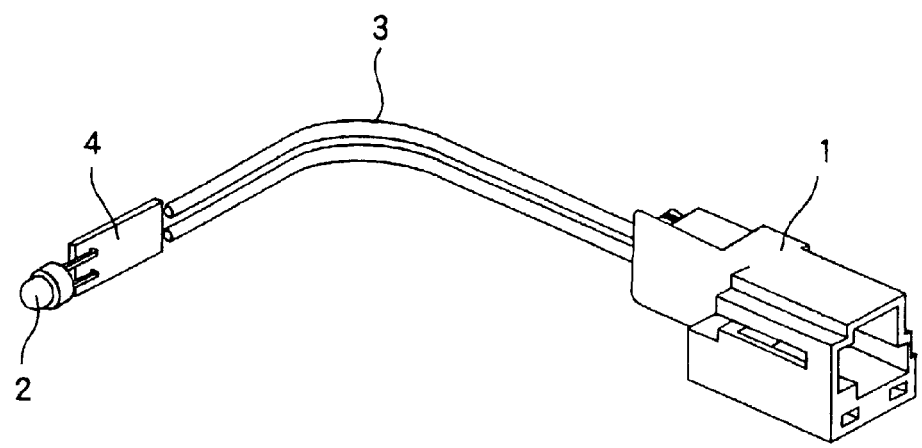
FIG. 1 is a perspective view of the illumination lamp equipment according to the first embodiment of the present invention showing a state before molding.
Figure 2:
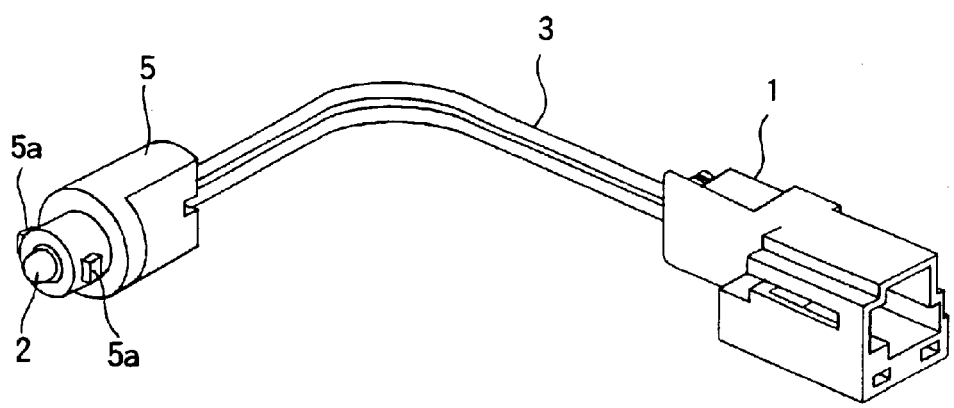
FIG. 2 is the same view as FIG. 1 showing a state after molding.

Referring now to the drawing, an embodiment of the illumination lamp equipment according to the present invention will be described. FIG. 1 and FIG. 2 show the first embodiment, in which the connector 1 to be connected to the power supply (the connector shown in the figure is a female connector) and the illumination lamp 2 such as a LED, a small light bulb, or the like (the LED is shown in the figure) are provided separately, and the LED 2 and the connector 1 is connected by the lead 3.

The connector 1 used here is a known type, which is detachably mounted to the male connector (not shown) for receiving power supply. Since the terminal of the illumination lamp 2 is connected to the printed board 4 to which a protective resistor (not shown) is connected, and the printed board 4 is in turn connected to the lead 3, the illumination lamp 2 is electrically connected to the connector 1.

In this embodiment, the printed board 4 and the illumination lamp 2 except for a part of the head portion are molded by injection molding using a hot-melt resin. Hereinafter, the portion formed by molding is referred to as a molded portion 5.

Figure 5:
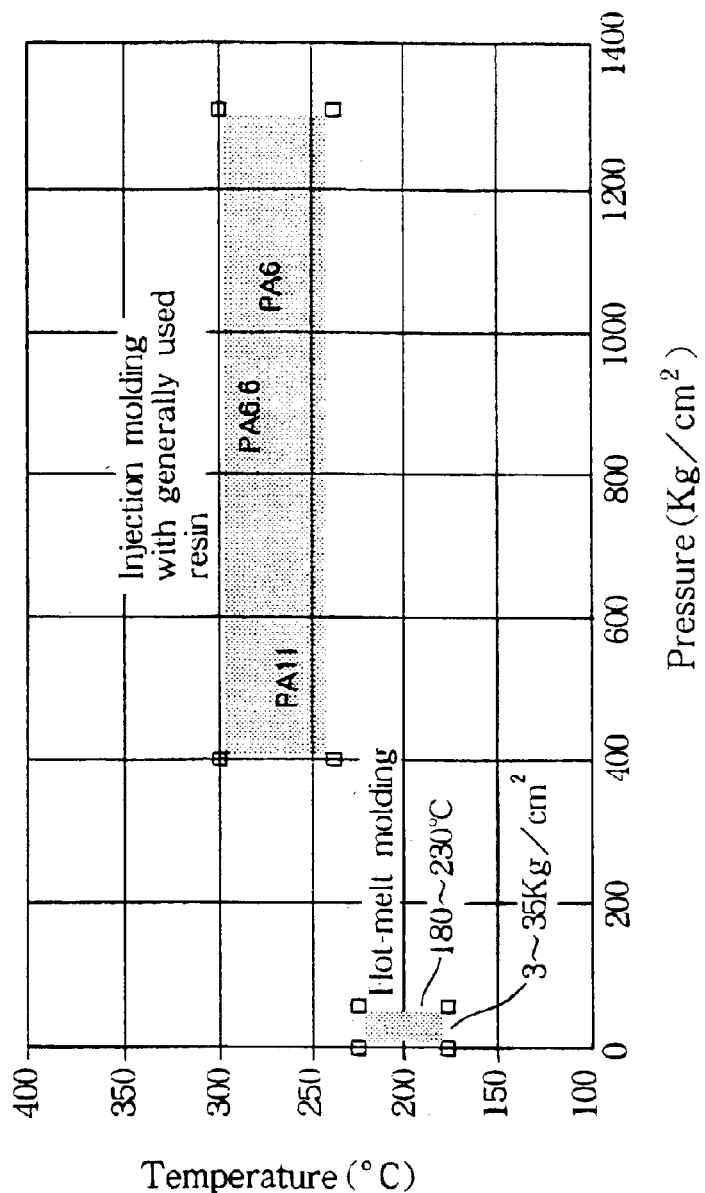
FIG. 5 is a comparative table showing the injection temperature and the injection pressure that vary according to the material of molding resin.

Since the temperature of the hot-melt resin during injection is in the range of 175 to 225° C. and the injection pressure thereof is in the range of 3 to 35 Kg/cm$^2$ as is apparent from FIG. 5, which is lower both in temperature and pressure in comparison with the generally used synthetic resin, even the illumination lamp 2 such as a LED, a small light bulb, or the like that may easily be affected by heat and pressure may be prevented from being melted by heat or being broken by the pressure.

Since the hot-melt resin is a material that is primarily used for adhesive agent, it exhibits superior adhesiveness, waterproof property, dust-proof property, and shake-proof property, molding the illumination lamp 2 with a hot-melt resin having such characteristics may prevent occurrence of breakdown even when it gets wet in the rain or gathers dust, or even when it is exposed to vibration during travel when mounted on the vehicle.

In the figure, the molded portion 5 is formed with a projection 5a. The projection 5a is to be used as a claw for fixing to the mounted member such as the vehicle, the electronic equipment or the like, and the configuration thereof may be modified depending on that of the mounting portion of the mounted member.

Figure 3:
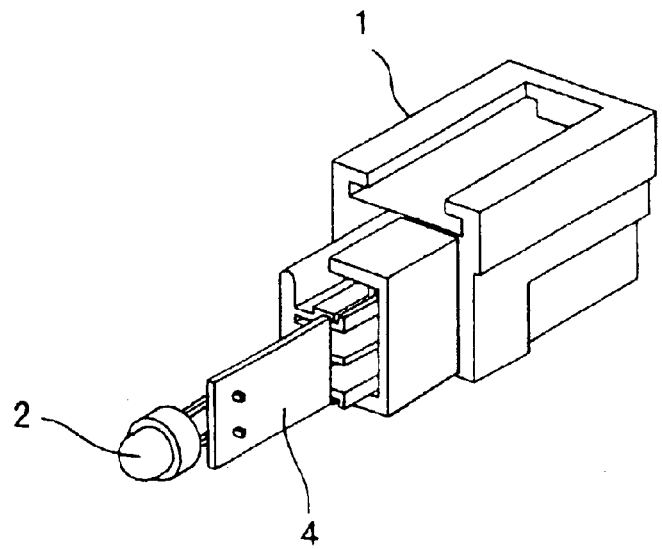
FIG. 3 is a perspective view of the second embodiment showing a state before molding.
Figure 4:
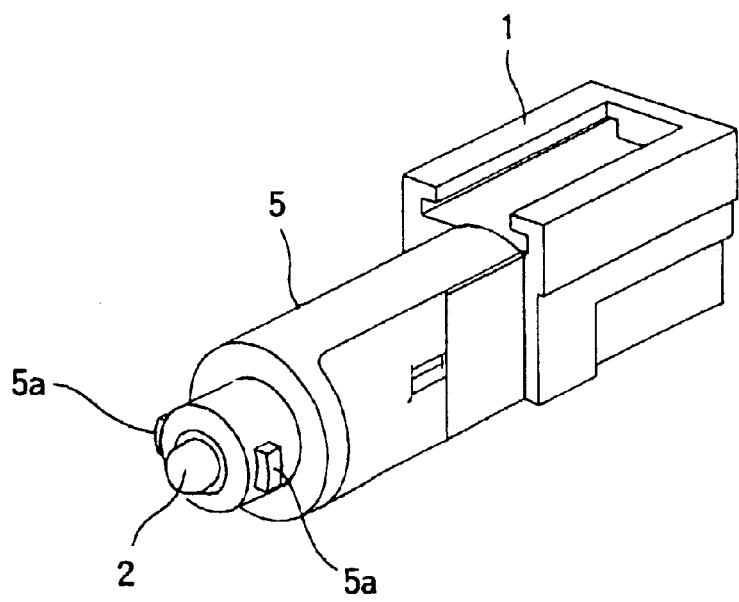
FIG. 4 is the same view as FIG. 3 showing a state after molding.

Referring now to FIG. 3 and FIG. 4, the second embodiment will be described. In this embodiment, the illumination lamp 2 and the connector 1 are combined as a single unit. The same reference numerals as the first embodiment described above designate the same members, and the description is not made again.

In this embodiment, a part of the connector 1, the entire printed board 4, and the illumination lamp 2 except for the head portion are molded with a hot-melt resin in a state in which the conductive pattern of the printed board 4 on which the illumination lamp 2 is mounted and the terminal of the connector 1 are soldered.

In this embodiment as well, the illumination lamp integrated with the connector 1 is obtained while preventing the illumination lamp 2 from being melted or damaged as in the case of the first embodiment. In addition, by mounting the molded portion 5 to the mounted body by the use of a projection 5a, the connector 1 can also be mounted. Therefore, the illumination lamp 2 can receive power supply only by connecting the male connector to the connector 1.

Since the illumination lamp constructed of a LED or a small light bulb is molded with a hot-melt resin with a part of the head portion of the illumination lamp exposed in the present invention, the illumination lamp is prevented from being melted or damaged due to the temperature of the pressure during molding. Concurrently, since the illumination lamp is covered by the hot-melt resin except for the head portion, it is prevented from being damaged even when an impact is applied thereto when it is mounted on the mounted body or while it is in use.

Moreover, since the lead of the illumination lamp constructed of a LED or a small light bulb is connected to the terminal of the connector in advance, and then the illumination lamp and a part of the connector are molded with the hot-melt resin with a part of the illumination lamp exposed, the connector is fixed on the mounted body simply by mounting the illumination lamp on the mounted body, thereby eliminating the necessity of the lead, simplifying the mounting operation onto the mounted body, and decreasing time and cost.

What is claimed is:

1. A method of making an illumination light assembly comprised of a printed circuit board, and a light emitting diode having a lead portion connected electrically to the printed circuit board, and an illumination head portion, said method comprising encasing both the lead portion of the light emitting diode (LED) and the printed circuit board by injection molding a hot melt resin material onto the lead portion of the LED and the printed circuit board while preventing the hot melt resin from covering the illumination head portion of the LED such that an illumination head portion of the LED remains visibly exposed from the injection molded hot melt resin, wherein the hot melt resin has an injection molding temperature in the range of 175° C. to 225° C. and an injection molding pressure in the range of 3 to 35 Kg/cm$^2$.

2. The method of claim 1, which further comprises establishing electrical connection between the printed circuit board and a connector with a lead.

3. The method of claim 2, which further comprises establishing electrical connection directly between the printed circuit board and a connector.

* * * * *